UNITED STATES PATENT OFFICE.

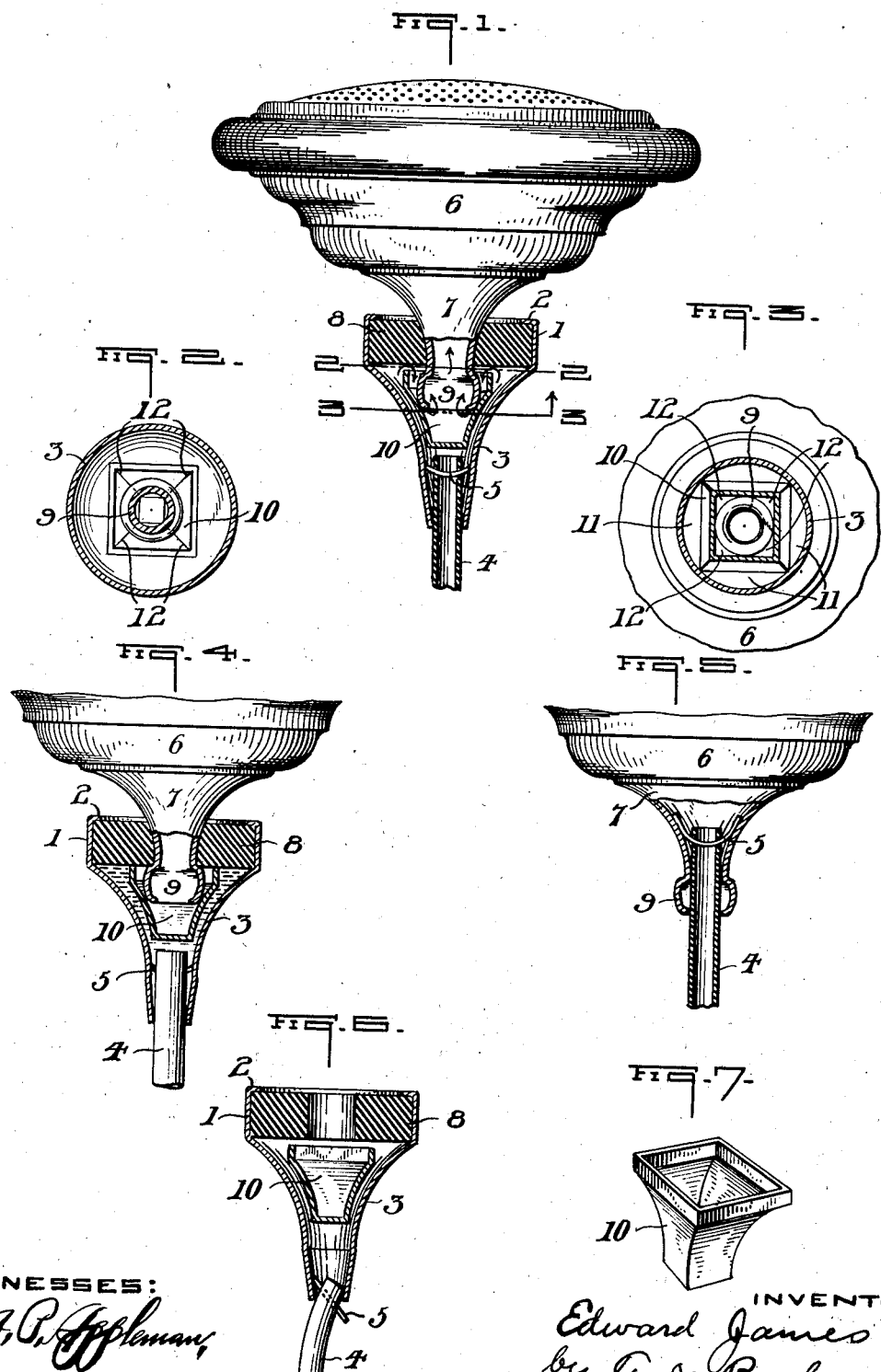

EDWARD JAMES, OF CLEVELAND, OHIO, ASSIGNOR TO THE JAMES MANUFACTURING COMPANY, OF CLEVELAND, OHIO, A CORPORATION OF OHIO.

FLUID-TRANSMISSION APPARATUS.

No. 929,091.   Specification of Letters Patent.   Patented July 27, 1909.

Application filed February 6, 1908. Serial No. 414,515.

*To all whom it may concern:*

Be it known that I, EDWARD JAMES, a citizen of the United States, residing at Cleveland, in the county of Cuyahoga and State of Ohio, have invented or discovered new and useful Improvements in Fluid-Transmission Apparatus, of which the following is a specification.

My invention relates to apparatus for connecting together various water distributing devices and has relation particularly to bath-room appliances but it may be employed otherwise. It may to some extent be used for gases as well as for liquids.

The objects of my invention are to provide a cheap and ready means for connecting hose to holdfasts, roses, and the like, and to provide a valve of novel construction which is included within the holdfasts, rose, or the like and can be easily controlled by the hand to control the flow of fluid.

Referring to the accompanying drawings, Figure 1 is a central section of a holdfast and a rose embodying my invention, the rose being partly in side elevation and the valve open; Fig. 2, a section on the line 2—2, Fig. 1; Fig. 3, a section on the line 3—3, Fig. 1; Fig. 4, a section like Fig. 1 but with the valve closed; Fig. 5, a view like Fig. 4 but with the holdfast omitted; Fig. 6, a section of the holdfast showing the method of inserting the hose; and Fig. 7, a perspective of the valve.

On the drawings, 1 represents a metal casing having the inturned flange 2 at one end and the tapering tubular extension 3 at the other end. Preferably this extension is circular in cross-section and has its lower end internally of such a size as to receive therein a hose of the desired diameter. The end of the hose 4 has therein a preferably curved or bent cross-pin 5 which extends entirely through the hose and projects outwardly some distance beyond the hose. In Fig. 6 I have shown how the hose with the cross-pin therein may be inserted through the small end of the casing. One end of the pin and the end of the hose are first inserted in the extension 3, the pin being inclined to the length of the hose. When the hose with the pin has been pushed farther into the extension, the elasticity of the hose will cause the pin to lie squarely across the hose as shown in Figs. 1 and 4. In case the rose 6 is used without a holdfast (see Fig. 5) the hose with the pin will be inserted into the rose precisely as described for the holdfast. The pin has its ends in contact with the wall of the extension 3 or the tapering extension 7 of the rose. In this position the pin will prevent the pressure applied longitudinally of the hose against the end thereof from ejecting the hose. With this endwise pressure neutralized and a portion of the outside of the hose in contact with the casing, not only will there be no danger of ejecting the hose but there will be a differential of pressure within the hose tending to press it tighter against the casing as the pressure increases. At all pressures this differential will prevent the escape of fluid around the exterior of the hose.

Within the casing 1 is the elastic, preferably rubber, disk 8 seated against the flange 2 which prevents the disk from being ejected by the fluid pressure below the same. The disk has a central opening to receive the hub 9 of the rose 6 or the end of some other connection for the transmission of fluid.

Within the extension 3 and between the disk 8 and the end of the hose 4, I place what I term the cone-valve 10. This valve is polygonal in cross-section and tapering as desired from the top downward and is composed of thin light material in the form of a cup, the lower or smaller end being closed.

When the valve is free to move, the fluid pressure within the casing will obviously seat the valve against the disk 8, and the opening in the disk being included within the area covered by the larger or upper end of the valve, no fluid can escape through the said opening. When the hub 9 of a rose is inserted through the disk and into the hollow of the valve, and sufficient pressure is applied to the rose, the valve will be unseated, as shown in Fig. 1, and fluid will flow from the hose 4 up in the spaces 11 between the outer faces of the valve and the wall of the extension 3 and thence down through the triangular spaces 12 in the inner angles of the valve between the hub 9 and the said angles.

The rate of fluid flow can be adjusted during use by varying the distance of the cone-valve from the disk. This adjustment can be made by the hand that holds the rose while in use, thus doing away with the annoyance of having to look for and use valves more or less distant from the user of the rose. In many cases the use of valves is entirely dispensed with. It is not absolutely essential that the valve and the extensions 3 and 7 have the cross-sections shown, as the cross-sections can be varied as desired provided passages are provided to permit the fluid to pass up externally of the valve and down internally of the same. I desire to claim the valve broadly.

Broadly considered the disk 8 is a part of the casing and for some purposes might be a part thereof.

I do not limit myself to the precise details and combinations described and shown.

I claim—

1. The combination of a casing, a tubular connection attached to one end, an elastic perforated disk secured in the other end, a fluid transmission device located within the perforation in the said disk and having an axial inlet, and a valve in the casing between the disk and the said tubular connection, said valve adapted to be seated around said perforation and to be moved from its seat by said fluid transmission device there being a space between the end of said device and the valve to permit the fluid to pass through the said space and thence into the said inlet opening.

2. The combination of a casing having an opening, means for leading fluid thereto, a cup-shaped valve having its edge adapted to be seated around the said opening in the casing, and an open-ended fluid transmission device movable in said opening to unseat the valve and permit the fluid to move past the end of the device and into the said inlet.

3. The combination of a casing with an opening, a hollow cup-shaped valve within the casing and adapted to be seated around the opening, a fluid transmission device movable in the opening and engageable with the interior of the valve to unseat the same, and having the end within the cap open to form an inlet the valve and the said device being so shaped relatively that fluid can pass between them and through the said inlet, when the said device has moved the valve from its seat.

4. The combination of a casing with an opening, a hollow cup-shaped valve within the casing and adapted to be seated around the opening, a fluid transmission device movable in the opening and engageable with the interior of the valve to unseat the same, the said valve having a polygonal cross-section and the end of the said device in engagement with the valve having a different cross-section so that fluid can pass through the spaces between the valve and said end when in engagement.

5. The combination of a casing having an extension with a contracted opening, a hose fitting in said opening, and a cross pin extending through said hose and engaging the walls thereof, said cross-pin being wholly supported by the hose.

6. The combination of a casing having an opening, a hose within the said opening, and a cross-pin extending through said hose and having portions thereof engaging the interior surface of the casing, said cross-pin being wholly supported by the hose.

Signed at Cleveland, O., this 7th day of December, 1907.

EDWARD JAMES.

Witnesses:
EDWARD P. RUDOLPH,
ROBERT W. McGUFFIE.